INVENTOR.
JASPER WILLSEA

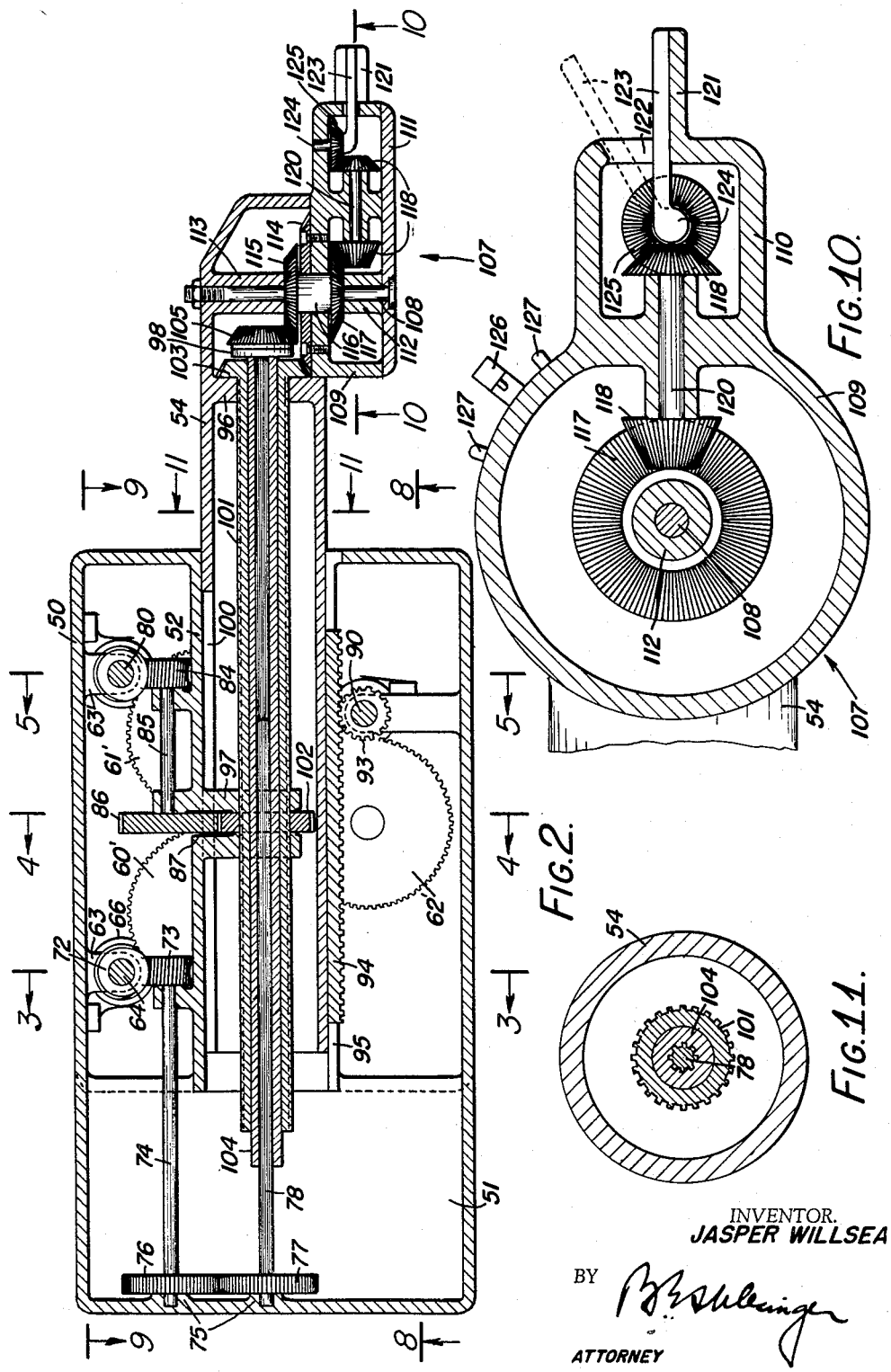

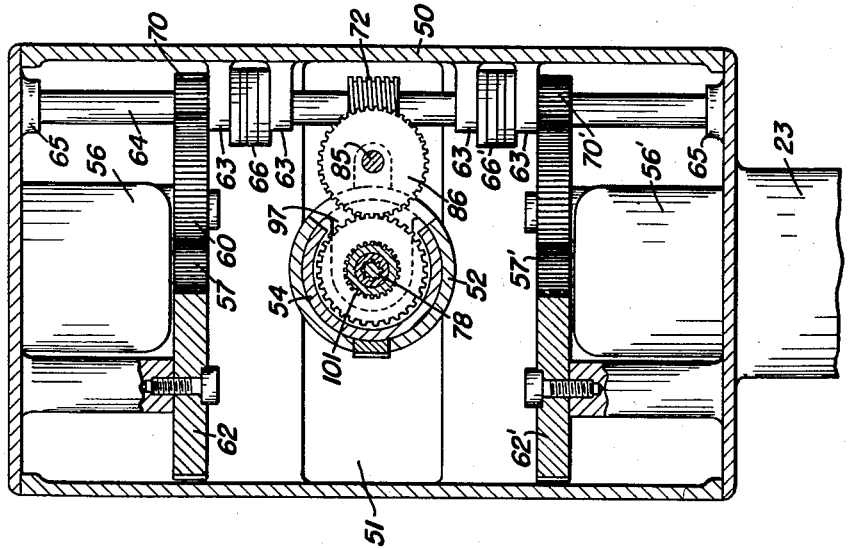
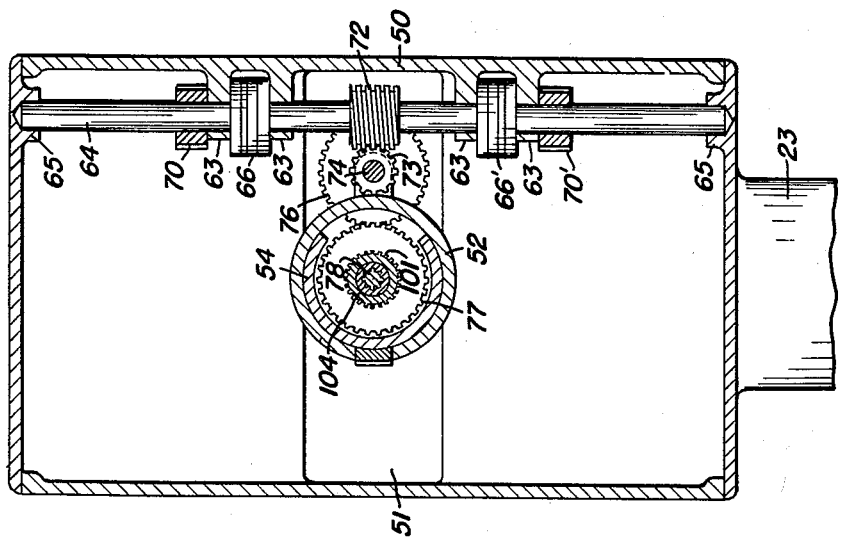

Nov. 8, 1960

J. WILLSEA 2,959,301

TRANSFER MECHANISM

Filed Oct. 7, 1957

INVENTOR.
JASPER WILLSEA

BY

ATTORNEY

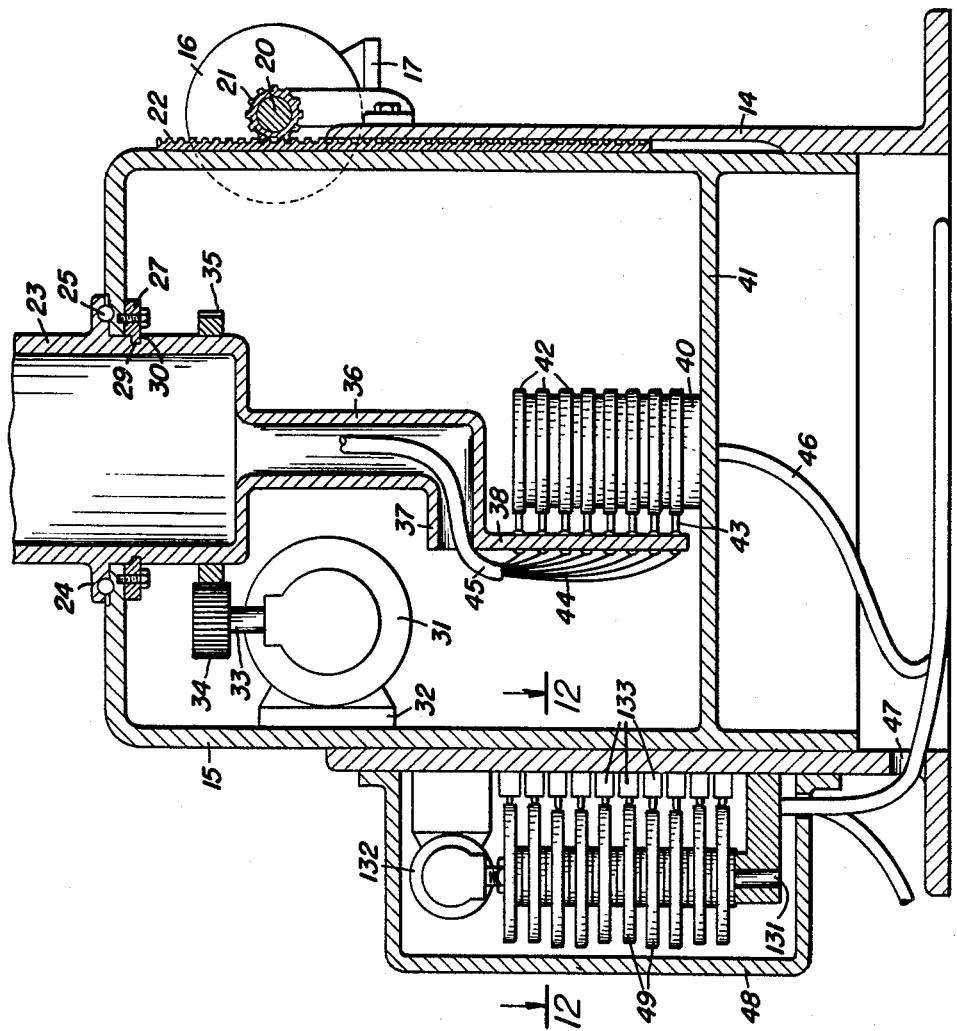
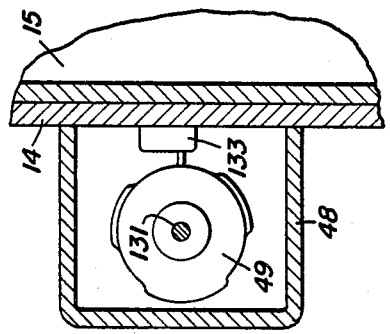

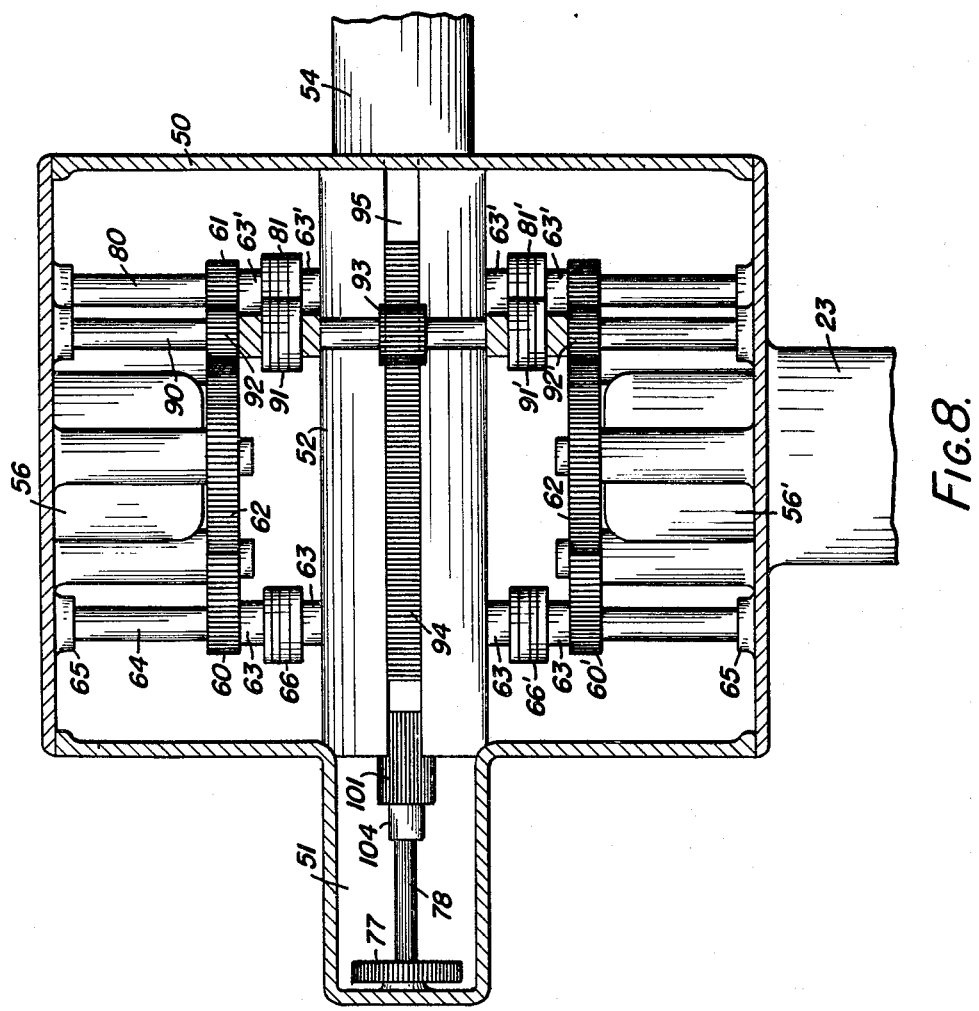

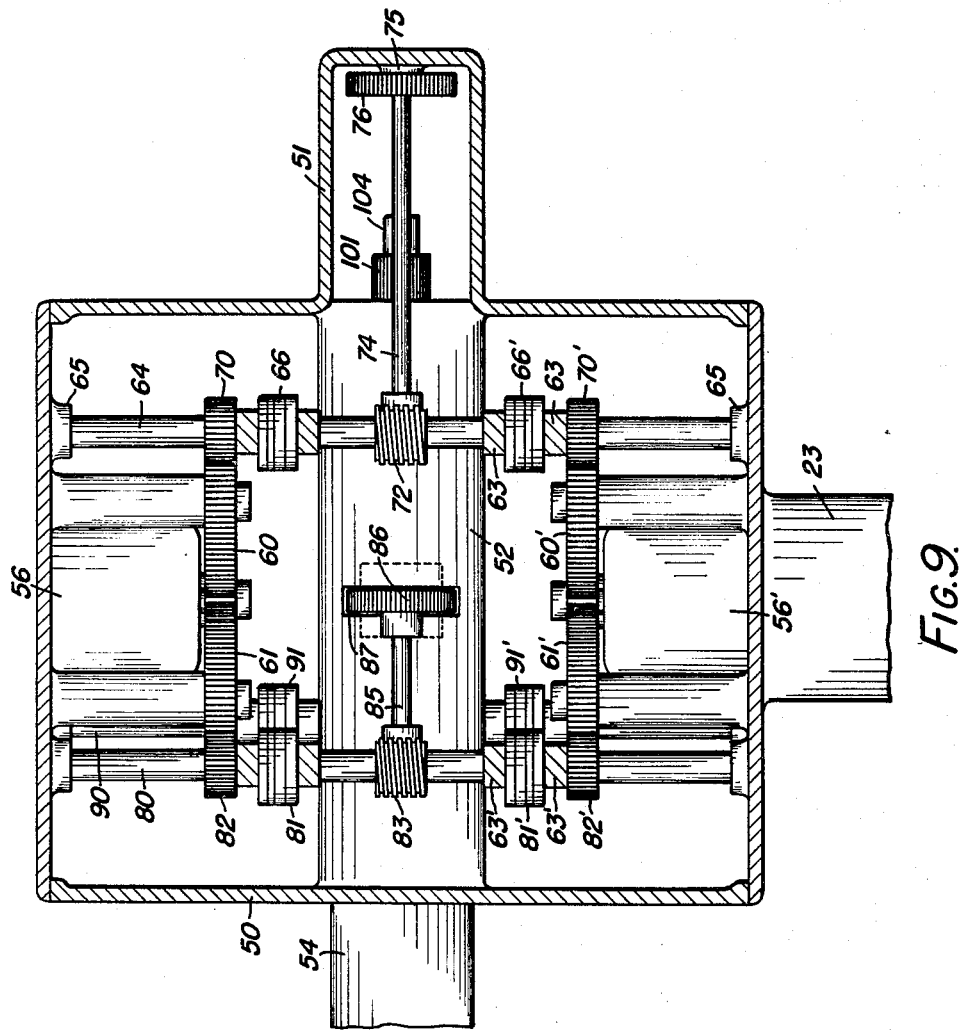

United States Patent Office 2,959,301
Patented Nov. 8, 1960

2,959,301

TRANSFER MECHANISM

Jasper Willsea, 430 Lake Road, Webster, N.Y.

Filed Oct. 7, 1957, Ser. No. 688,765

4 Claims. (Cl. 214—1)

The present invention relates to transfer devices, and particularly to transfer devices such as may be used in a factory for transferring workpieces from a conveyor belt to a machine, or vice versa, or from one machine to another. In a more specific aspect, this invention relates to a device that can perform mechanically all of the transfer movements that a human worker can perform.

With hand tools, a completed product usually involved only a single, hard-working, highly skilled artisan. With automatic machinery, the most complicated operations are done more rapidly, with more uniform high quality. The machine operator may have very limited capability, as compared to the artisan, but once trained to operate the automatic machinery, he can often do the whole job in a single machine faster and at much less cost.

While the work week was being reduced from sixty to forty hours, there was a very much greater reduction made in the number of man hours required for a unit of completed product. These man-hour havings are the pivotal consideration in the economics of automatic machinery which has given us more and better things with more leisure, and with a wider range of human capability to share them.

The demand for automatic, and more automatic machinery goes on. With continuously rising labor costs, means must be provided for meeting the increased cost of human effort with an equivalent reduction in cost, or the product will price itself out of the market. This is the reason why more and more automation is being employed.

An important factor in determining the progress, that can be made in any industry, toward an "automated" factory is the ability to duplicate some of the more subtle functions for which human workers are presently required. Frequently, in present day factories, human effort is concentrated in relocating workpieces from machine to machine. Often the important human functions are performed with the hand and the arm, as controlled by the human brain and supported by the mobile human body. Machines already do a job more efficiently and often better than a skilled worker. The next logical step in the development of automatic production is to eliminate the interruption, that occurs between two or more sets of operations on a given machine or machines while the manner in which the workpiece is grasped is being changed, or while the workpiece is being shifted from one machine to another. This requires apparatus for handling the workpiece discretely rather than as in the usual machine which grasps the workpiece only once in a complete cycle of operations thereon. It is apparatus of this nature that is required for further advancement in automation. What is required is a machine that can duplicate what are essentially the hand-arm movements of a human worker, in a controlled manner, similar to that type of control that would be exercised by the human brain.

One object of the present invention is to provide a simple mechanism that is capable of duplicating the hand-arm movements of a human worker.

Another object of the invention is to provide a mechanism that is capable of grasping and transfer movements, for relocating objects, in a manner similar to the same movements of a human worker.

Another object of the invention is to provide an automatic device that will perform grasping, transfer, and release functions, repetitively, through automatic controls.

A more specific object of the invention is to provide a mechanism capable of grasping, transferring, and releasing objects, consecutively, and that can also be moved in directions to duplicate the movements of which a human worker is capable through use of his heels and toes.

Another specific object of the invention is to provide a device of the character described that is capable of translational and rotational movement in both a horizontal and a vertical plane, so that the objects being transferred can be moved from any selected point to any other selected point, in three-dimensional space.

A more general object of the invention is to provide a mechanical device that can be substituted for a human worker, and that will replace and duplicate the functions of the human hand and other cooperating mechanical members of the human body, under automatic, systematic control, so that some of the more tedious forms of human labor can be replaced.

Other objects of the invention will be apparent hereinafter from the specification and from the recital of the appended claims when taken in conjunction with the accompanying drawings.

One embodiment of the invention is shown in the drawings. The transfer mechanism illustrated has a fixed base within which a pedestal is mounted to move up and down to elevate and to lower the mechanism. A vertical column is mounted rotatably on the pedestal for rotation about a vertical axis. A housing is secured on the top of the column. An arm is mounted in the housing, for horizontal reciprocating movement in and out of the housing and for rotational movement about a horizontal axis in both directions. Pivotally mounted on the arm for movement about a horizontal axis is an assembly comprising two jaws mounted for pivotal movement of one relative to the other.

There is thus provided a device in which one jaw can be pivoted toward and away from the other to grasp and release objects. The jaws are rotatable on the arm about a horizontal axis, to move any object grasped angularly in a vertical plane. The arm can be moved in and out to move the jaws toward and away from the base. The housing can be rotated on the vertical shaft in either direction, and can be raised and lowered on the base, to rotate the jaws in a horizontal plane about a vertical axis and to raise and lower the base vertically, respectively. This combination of movements permits the jaws to be moved together with an object grasped therebetween between any selected points in three-dimensional space.

It can be seen that this device can be operated to perform many of the grasping, transfer, and release functions that are now performed by human workers. To accomplish these functions repetitively, a control system is provided, including a rotary cam and cooperating electrical switches. To determine when an object is to be grasped or released, adjustable trip dogs and a cooperating adjustable limit switch are provided to move one jaw toward or away from the other at the proper times in the cycle. The control system replaces the memory and command functions normally exercised by the human brain where human labor is employed.

The structure of the device, and its operation, will be more readily understood by a consideration of the detailed description thereof that follows, with reference to th accompanying drawings.

In the drawings:

Fig. 2 is a section taken on the line 2—2 of Fig. 1, looking in the direction of the arrows;

Fig. 3 is a section taken on the lines 3—3 of Figs. 1 and 2 looking in the direction of the arrows;

Fig. 4 is a section taken on the line 4—4 of Fig. 1, looking in the direction of the arrows;

Fig. 7 is an axial section of the base assembly, taken on the line 7—7 of Fig. 1, looking in the direction of the arrows;

Fig. 8 is a front section of the housing, taken on the line 8—8 of Fig. 2, looking in the direction of the arrows;

Fig. 9 is a rear section of the housing, taken on the line 9—9 of Fig. 2, looking in the direction of the arrows;

Fig. 10 is a section taken on the line 10—10 of Fig. 2, on an enlarged scale, and looking in the direction of the arrows;

Fig. 11 is a section taken on the line 11—11 of Fig. 2, on an enlarged scale, and looking in the direction of the arrows; and Fig. 12 is a section taken on the line 12—12 of Fig. 7, looking in the direction of the arrows.

Figure 1:
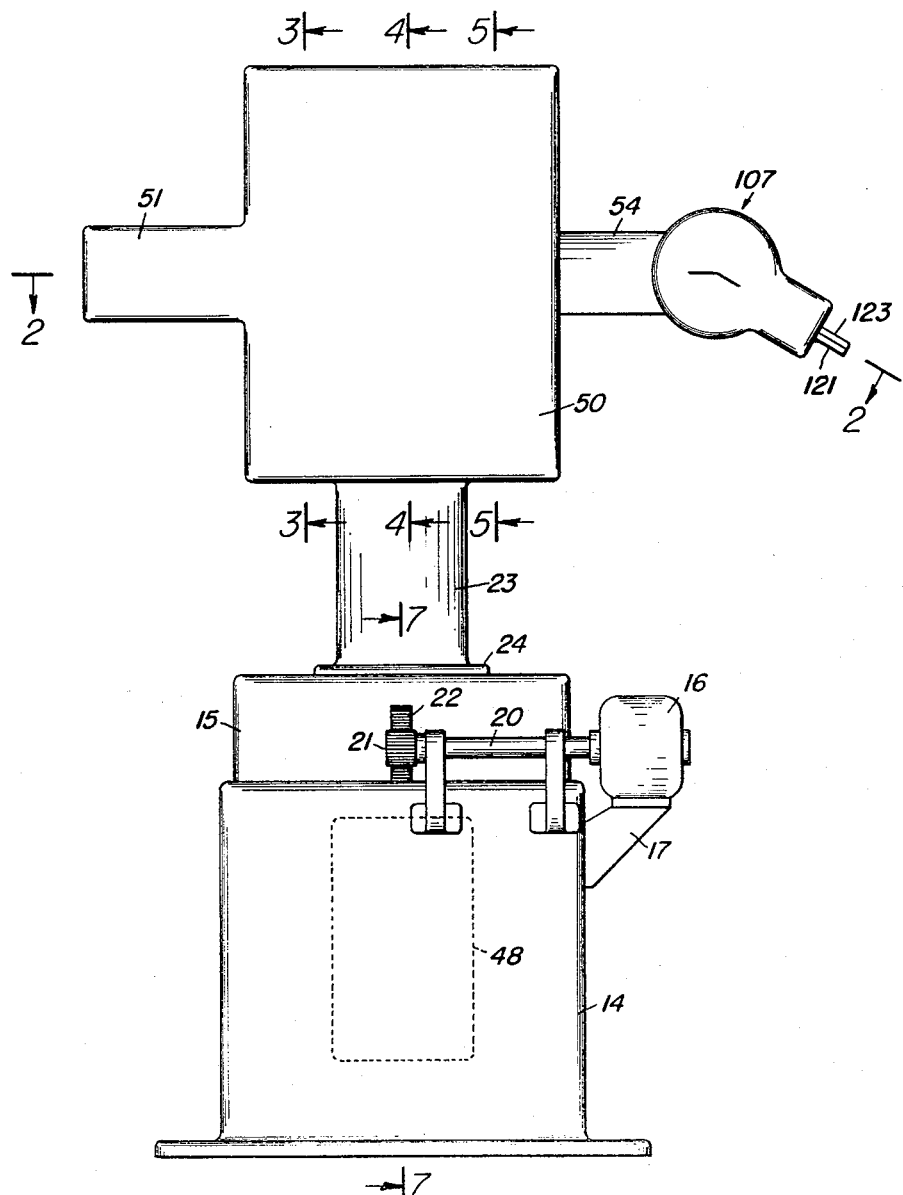
Fig. 1 is a front elevation of a mechanism constructed according to one embodiment of this invention.

Referring now in detail to the drawings, the transfer mechanism includes a fixed rectangular shaped base 14 that has a hollow bore. A pedestal 15 is mounted for vertical reciprocation in the bore of the base 14. An electric motor 16 is mounted on a bracket 17 that is secured on the base 14. The motor is mounted to drive a shaft 20 and a pinion 21 that is mounted on the shaft. A vertically disposed rack 22 (Fig. 7) meshes with the pinion 21. The electric motor 16 is reversible and can be operated in either direction to rotate the pinion 21 to move the rack 22 and the pedestal 15 up or down.

A column 23 is rotatably mounted on the pedestal 15. The column 23 has a flange 24 and is mounted on the pedestal 15 by means of a ball bearing 25. A ring 27 is secured to the base 15. It is formed with a gib portion 29 that projects into a keyway 30 that extends circumferentially of the column 23, to secure the column 23 against axial movement relative to the pedestal 15.

A reversible electric motor 31 is mounted on a bracket 32 inside the base 15. The motor 31 drives a shaft 22 and a pinion 34 that is mounted at the end of the shaft. The pinion 34 meshes with a gear 35 that is secured around the column 23. To rotate the column 23 in either direction, the motor 31 is driven in the appropriate direction.

The column 23 is formed with a reduced lower end extension 36 that projects axially into the base 15. The reduced end extension 36 is formed with a radially-directed portion 37 that has an arm 38 depending downwardly therefrom.

A contact drum 40 is mounted on a web 41 in the base 15. The contact member 40 is mounted in fixed position, and has a plurality of axially-spaced electrical contact rings 42 arranged peripherally thereon. A corresponding plurality of brushes 43 are mounted on the downwardly depending arm 38; and each brush 43 engages a selected and corresponding one of the rings 42. Each brush 43 is electrically connected at the arm 38 with a lead wire 44. The lead wires 44 are gathered together in a single cable 45 that extends through the bores, respectively, of the radial projection 37, and the reduced end extension 36, of the column 23, to carry the lead wires 44 in compact form to various limit switches, to be described presently. A cable 46 similarly made up of a plurality of individual wires leads from the rings 42 out of the base 14 through an aperture 47 therein.

A control box 48 is mounted on one wall of the base 14. Within the box 48, a plurality of cams 49 (Figs. 7 and 12) are adjustably secured to a shaft 131 that is driven by a constant speed motor 132. Each cam is mounted to engage an electrical switch 133, successively to close and to open the switch as the shaft 131 rotates. Each switch 133 is connected to a corresponding contact ring 42 in the pedestal 15, through a lead wire (not shown) in the cable 46. The cams 49 are selectively, individually adjusted angularly on the shaft 131, to close and open the electrical switches 133 at the proper times in the cycle of operation of the mechanism.

Referring again to Fig. 1, a housing 50 is rigidly mounted on the column 23. The housing 50 is a box-like structure that is closed on all sides, and that has a reduced extension 51 at one side thereof. Referring now to Fig. 2, the housing is formed with a longitudinally-extending, integral tubular portion 52 that extends from one side to the other. An arm 54 is reciprocably mounted in the tubular portion 52.

Figure 5:
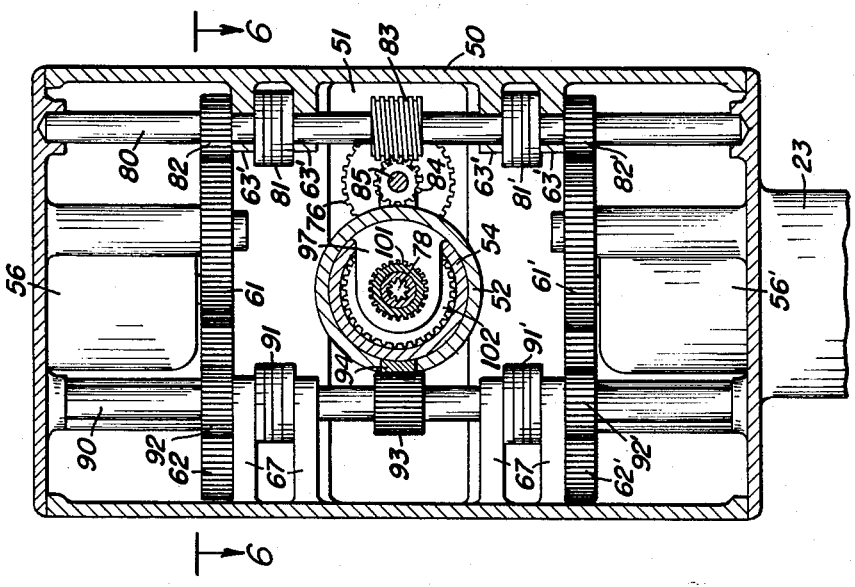
Fig. 5 is a section taken on the line 5—5 of Fig. 1, looking in the direction of the arrows.

Referring to Figs. 4 and 5, an upper electric motor 56 and a lower electric motor 56' are mounted one above the other, within the housing, with their axes aligned with each other and with the axis of the column 23. The motors drive an upper and a lower pinion, 57 and 57', respectively. Each said pinion meshes with three gears, 60, 61, and 62, and 60', 61', and 62', respectively. The motors 56 and 56' rotate continuously and in opposite directions.

Figure 6:
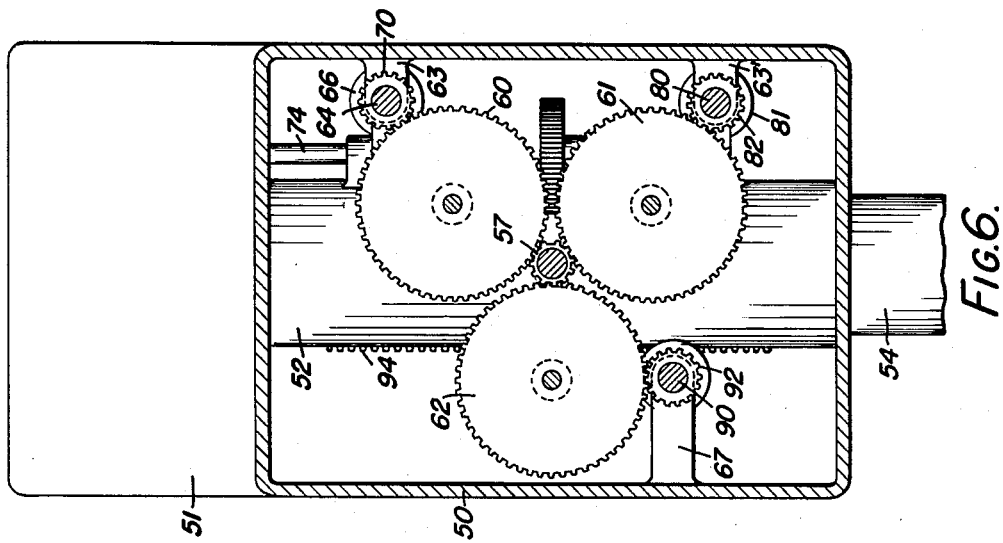
Fig. 6 is a section taken on the line 6—6 of Fig. 5, looking in the direction of the arrows.

Referring specifically to Figs. 2 and 3, the housing 50 is formed on its rear wall with a plurality of vertically-aligned internally-projecting bearings 63. The bearings 63 are arranged in spaced pairs, one above the other. A sectional shaft 64, that is formed in three sections, upper, lower, and middle, respectively, is rotatably mounted in the bearings 63. At its upper and lower ends, the shaft 64 is journaled in bearings 65 in the top and bottom of the housing 50. A magnetic clutch 66 connects the upper and middle sections of this shaft between the upper pair of bearings 63. A second magnetic clutch 66' is interposed between the middle and lower sections of the shaft 64, and between the lower pair of bearings 63. A pinion 70 is secured on the upper section of the shaft 64, immediately above the uppermost bearing 63, to mesh with the gear 60 (Fig. 6). Similarly, a pinion 70' is mounted on the lower section of the shaft 64, immediately under the lowermost bearing 63, to mesh with the gear 60' (Fig. 2).

A worm 72 is integral with or secured to the middle section of the shaft 64, to mesh with a worm wheel 73 that is supported in the housing on a horizontally-extending shaft 74 (Figs. 2 and 3). The shaft 74 is supported from the tubular portion 52, adjacent the worm wheel 73; and at its outer end, the shaft 74 is journaled in a bearing 75 formed on the inside of the housing extension 51. A gear 76 is secured to the shaft 74 to mesh with a gear 77 that is secured on a parallel shaft 78.

To drive the shaft 78 in one direction, the clutch 66 is energized and the clutch 66' is deenergized. To drive the shaft 78 in the opposite direction the clutch 66 is deenergized and the clutch 66' is energized. The upper and lower sections of the shaft 64 are constantly driven in opposite directions from the motors 56, 56', so that when one of the clutches 66, 66' is energized, the other must be deenergized.

Referring now to Fig. 5, the housing is formed on its rear wall with a second group of internally-projecting bearings 63'. A sectional shaft 80, similar to shaft 64, is rotatably mounted in these bearings. The bearings 63' are mounted in spaced pairs, one pair above the other. At its upper and lower ends, the shaft 80 is journaled in the top and bottom of the housing. A magnetic clutch 81 is interposed between the upper and middle sections of the shaft 80, between the upper pair of bearings 63'. A second magnetic clutch 81' is interposed between the middle and lower sections of the shaft 80, and between the lower pair of bearings 63. A pinion 82 is secured on the upper section of the shaft 80, immediately above the uppermost bearing 63, to mesh with the gear 61. Similarly, a pinion 82' is mounted on the lower section of the shaft 80, immediately under the lowermost bearing 63, to mesh with the gear 61'.

A worm 83 is integral with, or secured to, the middle section of the shaft 80, to mesh with a worm wheel 84 that is secured to a horizontally-extending shaft 85. The shaft 85 is supported from the tubular portion 52, and a gear 86 is secured to the shaft 85 to extend into a recess 87 that is formed in the tubular portion 52.

The housing 50 is also formed on the inside of its front wall with a plurality of bearings 67 that are mounted in pairs, one above the other, and in which a sectional shaft 90 is rotatably mounted. At its upper and lower ends, the shaft 90 is journaled in the top and bottom of the housing. The shaft 90 is formed in three sections, upper, lower, and middle. A magnetic clutch 91 is interposed between the upper and middle sections of this shaft, and between the upper pair of bearings 67. A second magnetic clutch 91' is interposed between the middle and lower sections of the shaft 90, and between the lower pair of bearings 67. A pinion 92 is secured on the upper section of the shaft 90, immediately above the uppermost bearing 67, to mesh with the gear 62 (Fig. 6). Similarly, a pinion 91' is secured to the lower section of the shaft 90, immediately under the lowermost block 63, to mesh with the gear 62' (Fig. 2).

A pinion 93 is secured on the middle section of the shaft 90, to mesh with a rack 94 (Figs. 2 and 8) that is secured to the arm 54 axially thereof and that projects through an axially-extending slot 95 in the tubular portion 52. To move the arm 54 in or out of the housing 50 and sleeve 52, the middle section of the shaft 90 is driven in a selected direction through one of the electromagnetic clutches 91, 91'.

A bearing 96 (Fig. 2) is formed integral with the arm 54, adjacent its outer end. A pair of arms 97, which are integral with tubular portion 52, project through a slot 100 that extends axially along one side of the arm 54. A tubular shaft 101 is rotatably mounted in the bearings 96 and arms 97.

A pinion 102 is splined on the hollow shaft 101. The pinion 102 is mounted between the arms 97 to mesh with the gear 86. A bevel pinion 103 is integral with the shaft 101 at its outer end.

A second tubular shaft 104 is rotatably mounted within the bore of the shaft 101, but is held therein against relative axial movement. A bevel pinion 105 is adapted to be connected to the shaft 104 by an electromagnetic clutch 98. The shaft 104 is internally splined, and the shaft 78 is externally splined to connect the shaft 78 rotatably to the shaft 104, while permitting the shaft 104 to move axially relative to shaft 78. The shaft 78 is mounted at its outer end for rotation in a bearing 75 that is formed on the side wall of the housing extension 51.

A work-gripping assembly 107 is mounted to pivot about a stud 108 that is mounted on an extension of arm 54 with its axis at a right angle to the axis of the arm 54. The assembly 107 comprises a body or casing 109 that is formed with a lateral extension 110. A cover plate 111 is mounted over the open lower end of the body 109 and its extension 110. The casing 109 is formed with a hub 112 that is disposed coaxially with a corresponding hub 113 that is formed on the arm 54. The stud 108 is rotatably mounted in the hubs 112, 113. The stud or bolt 108 holds the assembly 107 in position on the end of the arm 54.

A bevel gear 114 is rigidly secured to one wall of the casing 109, to mesh with the bevel pinion 103. A bevel gear 115 is mounted coaxially with the gear 114. This gear is integral with hub 116 and meshes with the bevel pinion 105. A second bevel gear 117 is integral with hub 116. Hub 116 is journaled in assembly 107. There is also a shaft 120 journaled in assembly 107 to extend at right angles to the axis of hub 116. A pair of bevel pinions 118 are secured to shaft 120. One of the pinions 118 meshes with the bevel gear 117. The second bevel pinion 118 meshes with a bevel gear 125 that is secured to a stud shaft 124 which is journaled in the lateral extension 110 of the casing 107.

The end of the casing extension 110 is formed with a rigid gripping member or jaw 121 that is mounted to extend in a direction parallel to the axis of the shaft 120. The casing extension 110 is also formed with an aperture 122 (Fig. 10) at one side of the jaw 121. A movable jaw member 123, which may be likened to a thumb, is secured to shaft 124 for pivotal movement toward and away from the member 121, which may be likened to the fingers of a hand.

A switch 125 (Fig. 10) is mounted on the end of the arm 54, for engagement and actuation by adjustable trip levers 127 that are mounted on the circumference of the casing 109 of the assembly 107. The switch 126 is connected in a conventional manner to energize or de-energize the electromagnetic clutch 98 (Fig. 2) to connect or to disconnect the pinion 105 to or from the shaft 104, depending upon which of the trip levers 127 engages the switch.

Referring now to Fig. 7, each electrical switch 133 in the control box is connected to control one electrical device. For example, one switch is connected to energize the clutch 66 (Fig. 3) when the plunger of the switch is riding on the lobe of the associated cam 49, and to de-energize the clutch when the plunger of the switch rides down off the lobe of the cam. Similarly, one switch 133 is provided for each of the other clutches 66' (Fig. 3), 81, 81' (Fig. 5), 91, and 91' (Fig. 5), respectively, to be operated by an associated cam 49 (Fig. 7). A switch 133 is also provided for the pedestal motor 16 (Fig. 1), and for the column motor 31 (Fig. 7).

From the foregoing description, it can be seen that a single motion can be caused to take place at one time, or if desired, all of the motions, of which the machine is capable, can be caused to take place simultaneously. For example, when the clutch 98 (Fig. 2) is energized to connect the pinion 105 to the shaft 104, pivotal movement of the jaw 123 (Figs. 2 and 11) toward or away from the jaw 121 can be effected by energizing the electromagnetic clutches 66, 66' (Fig. 3), which control the direction of rotation of the middle section of the shaft 64. When the upper clutch 66 is energized, and the lower clutch 66' is deenergized, the continuously running upper motor 56 (Fig. 5) is connected to drive the middle section of the shaft 64. This connection is made from the motor 56, through the pinion 57 (Fig. 6), the gear 60, the pinion 70, the upper section of the shaft 64, and the upper clutch 66. As the shaft 64 is rotated, it drives the worm 72, the worm wheel 73 (Fig. 3), the shaft 74 (Fig. 2), the gears 76 and 77, the shaft 78, the hollow shaft 104, the pinion 105, the gears 115, 117, the pinions 118, and the pinion 125, to rotate the shaft 124 to cause the jaw 123 to pivot in one direction relative to the jaw 121. To move the jaw 123 in the opposite direction, the lower clutch 66' is energized, and the upper clutch 66 is deenergized. The lower motor 56', which is continuously rotating, then drives the lower section of the shaft 64 through the pinion 57', the gear 60', the pinion 70', and the clutch 66'.

The assembly 107 can be caused to rotate in either direction, about the shaft 108, by driving the middle section of the shaft 80 (Fig. 5) in the proper direction. The middle section of the shaft 80 can be driven in one direction from the upper motor 56 and in the opposite direction from the lower motor 56', by selective energization of the upper or lower electromagnetic clutches 81 and 81', respectively, that are interposed between the sections of the shaft 80. When the upper clutch 81 is energized, the middle section of the shaft will be driven by the continuously running upper motor 56 through a gear train that includes the pinion 57 (Fig. 6), the gear 61, the pinion 82, and the upper section of the shaft 80. When the upper electromagnetic clutch 81 is deenergized, and the lower clutch 81' is energized, the shaft is driven from the lower motor 56' through a gear train including the pinion 57', the gear 61', the pinion 82', and the lower section of the shaft 80. For either direction of rotation of the shaft 80, the worm 83 is rotated to drive the worm-wheel 84, the shaft 85, the gear 86 (Fig. 2), and the pinion 102, to turn the shaft 101, the pinion 103, and the gear 114. As the gear 114 is rotated, it rotates the assembly 107 about the stud 108.

Obviously, the jaw 123 can be pivoted relative to the jaw 121 to engage or release a workpiece or other object at a desired time as the assembly 107 is rotated about the shaft 108. To this end, the switch 126 (Fig. 10) and trip dogs 127 can be adjusted to energize and deenergize the clutch 98 at the desired times.

In similar manner, the arm 54 can be moved in and out of the tubular portion 52 simultaneously with the rotation of the assembly 107 about the shaft 108. To move the arm 54 in or out of the housing 50, the shaft 90 (Fig. 5) is rotated in one direction or the other by selective energization of the upper and lower electromagnetic clutches 91 and 92', respectively, that are interposed between the sections of the shaft. When the upper clutch 91 is energized, the upper and middle sections of the shaft 90 are driven from the continuously running motor 56, through a gear train including the pinion 57 (Fig. 6), the gear 62, the pinion 92, and the upper section of the shaft 90. When the upper clutch 91 is deenergized, and the lower clutch 91' is energized, the lower and middle sections of the shaft 90 are driven from the lower motor 56' through a gear train that includes the pinion 57', the gear 62', the pinion 92', and the lower section of the shaft 90. For each direction of rotation of the middle section of the shaft 90, the pinion 93 is driven to drive the rack 94 and the arm 54 in the direction of movement of the arm depending upon the direction of rotation of the middle section of shaft 90.

To change the elevation of the device, the motor 16 (Fig. 7) is driven to rotate the shaft 20, and the pinion 21, to drive the rack 22, to move the pedestal 15 in and out of the base 14.

To rotate the entire device through an angle, the motor 31 is driven to rotate the shaft 33, the pinion 34, and the gear 35 to drive the column 23.

From the foregoing discussion of the movements of the device, it can be seen that the pivotal movement of the jaw 123 relative to the fixed jaw 121 can perform grasping functions and release functions, analogous to those that are performed by the human hand. The rotation of the assembly 107 about its shaft 108 simulates the articulation of a wrist. The movement of the arm 54 in and out of the housing 50 simulates the back and forward motion that is obtainable through the combination linkage in the human body of the wrist, elbow, and shoulder. The up and down movement of pedestal 15 simulates that obtained by the up and down movements of which the human body is capable. The rotary movement of column 23 simulates the rotary movements of which the human body is capable. When all of the movements of which the machine is capable are considered together, it can be seen that the movements of a human worker can be duplicated with great exactness.

When control cams 49 of proper contour are used, the parts of the apparatus can be caused to operate in any desired sequence of movements, repetitively.

Since all of the various leverages that can be applied by this transfer mechanism can be applied simultaneously, the elapsed time for any operation involving sequential grasping, transferring, and releasing, can be minimized. In this way, the time required for any transferring operation is limited only by the speed at which the machine can be driven by its motors.

In the illustrated embodiment of the invention, the distance which the workpiece moves up or down in being transferred from a conveyor to a machine, or vice versa, or from one machine to another, is determined by movement of pedestal 15; the angle thereof which the arm 54 will travel when it swings in transferring the workpiece can be controlled through rotation of the column 23 about its vertical axis; the distance the assembly 107 travels linearly in effecting such transfer movement is determined by the movement of the arm 54 in and out of the housing 50; the angle through which the assembly 107 pivots in effecting such transfer is determined by the amount and direction of swing of casing 109 (Fig. 2); and the point at which the workpiece is grasped or is released is determined by the settings of the trip dogs 127 (Fig. 10).

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A transfer mechanism comprising a support, a tubular arm reciprocable rectilinearly in said support, a first shaft mounted in said arm for rotation about an axis extending in the direction of reciprocation of said arm, a supporting member pivotal on said arm about an axis extending at right angles to said direction, a pair of gripping jaws mounted on said supporting member, one of which is pivotal toward and from the other about an axis offset from but parallel to the axis of pivotal movement of said supporting member, a second shaft journaled coaxially in said first shaft, means connecting said arm and shafts to reciprocate together, means connecting said first shaft to said supporting member to pivot said supporting member on its axis on rotation of said first shaft, means connecting said second shaft to said pivotal jaw to pivot said jaw on its axis on rotation of said second shaft, and means for effecting movement of said arm rectilinearly, and rotation of said shafts in a desired, predetermined order whereby to cause said jaws to grip and transfer an object from one place to another and then to release said object, the means connecting said first shaft with said supporting member comprising a pair of bevel gears, one of which is coaxial with said first shaft and the other of which is coaxial with said supporting member, and the means connecting said second shaft with said pivotal jaw comprising a pair of bevel gears, which are coaxial, respectively, with the first-named pair of bevel gears.

2. A transfer mechanism comprising a support, a tubular arm reciprocable rectilinearly in said support, a first shaft mounted in said arm for rotation about an axis extending in the direction of reciprocation of said arm, a supporting member pivotal on said arm about an axis extending at right angles to said direction, a pair of gripping jaws mounted on said supporting member, one of which is pivotal toward and from the other about an axis offset from but parallel to the axis of pivotal movement of said supporting member, a second shaft journaled coaxially in said first shaft, means connecting said arm and shafts to reciprocate together, means connecting said first shaft to said supporting member to pivot said supporting member on its axis on rotation of said first shaft, means connecting said second shaft to said pivotal jaw to pivot said jaw on its axis on rotation of said second shaft, and means for effecting reciprocation of said arm and rotation of said shafts in a desired, predetermined order whereby to cause said jaws to grip and transfer an object from one place to another and then to release said object, the means for effecting reciprocation of said arm comprising two separate drives for moving said arm in opposite directions, respectively, and electromagnetically operated clutches for selectively connecting one of said drives to said arm, and the means for effecting rotation of said shafts, respectively, comprising in each case two separate drives for rotating the associated shaft in opposite directions, respectively, and electromagnetically operated clutches for selectively connecting, in each case, one of said drives to its associated shaft, a pair of electric drive motors which operate, respectively, in opposite directions, all the drives for driving the two shafts and for moving the arm axially, respectively, in one direction being connected to one of said motors, and all the drives for driving the two shafts and moving the arm axially, respectively, in the opposite direction being connected to the other electric drive motor.

3. A transfer mechanism comprising a support, a tubular arm reciprocable rectilinearly in said support, a first shaft mounted in said arm for rotation about an axis extending in the direction of reciprocation of said arm, a supporting member pivotal on said arm about an axis extending at right angles to said direction, a pair of gripping jaws mounted on said supporting member, one of which is pivotal toward and from the other about an axis offset from but parallel to the axis of pivotal movement of said supporting member, a second shaft journaled coaxially in said first shaft, means connecting said arm and shafts to reciprocate together, means connecting said first shaft to said supporting member to pivot said supporting member on its axis on rotation of said first shaft, means connecting said second shaft to said pivotal jaw to pivot said jaw on its axis on rotation of said second shaft, and means for effecting reciprocation of said arm and rotation of said shafts in a desired, predetermined order whereby to cause said jaws to grip and transfer an object from one place to another and then to release said object, the means for effecting reciprocation of said arm comprising two separate drives for moving said arm in opposite directions, respectively, and electromagnetically operated clutches for selectively connecting one of said drives to said arm, and the means for effecting rotation of said shafts, respectively, comprising in each case two separate drives for rotating the associated shaft in opposite directions, respectively, and electromagnetically operated clutches for selectively connecting, in each case, one of said drives to its associated shaft, and means for controlling the sequence of operation of said clutches comprising a plurality of coaxial rotary cams, and means for rotating said cams continuously during operation of the machine.

4. A transfer mechanism comprising a housing which is rotatable and is reciprocable in the direction of its axis of rotation, a tubular arm reciprocable in said housing in a direction at right angles to the axis of rotation of said housing, a first shaft mounted in said arm for rotation about an axis extending in the direction of reciprocation of said arm, a supporting member pivotal on said arm about an axis extending at right angles to the direction of reciprocation of said arm, a pair of gripping jaws mounted on said supporting member, one of which is pivotal toward and from the other about an axis offset from but parallel to the axis of pivotal movement of said supporting member, a second shaft journaled coaxially in said first shaft, means connecting said arm and shafts to reciprocate together, means connecting said first shaft to said supporting member to pivot said supporting member on its axis on rotation of said first shaft, means connecting said second shaft to said pivotal jaw to pivot said jaw on its axis on rotation of said second shaft, and means for effecting reciprocation of said arm and rotation of said shaft in a desired, predetermined order whereby to cause said jaws to grip and transfer an object from one place to another and then to release said object, the means for effecting reciprocation of said arm comprising two separate drives for moving said arm in opposite directions, respectively, and electromagnetically operated clutches for selectively connecting one of said drives to said arm, and the means for effecting rotation of said shafts, respectively, comprising, in each case, two separate drives for rotating the associated shaft in opposite directions, respectively, and electromagnetically operated clutches for selectively connecting, in each case, one of said drives to its associated shaft.

References Cited in the file of this patent
UNITED STATES PATENTS

| | | |
|---|---|---|
| 2,679,940 | Goertz | June 1, 1954 |
| 2,812,070 | Delzer | Nov. 5, 1957 |

FOREIGN PATENTS

| | | |
|---|---|---|
| 525,009 | Great Britain | Aug. 20, 1940 |